United States Patent [19]

Muisener et al.

[11] Patent Number: 5,273,662

[45] Date of Patent: * Dec. 28, 1993

[54] PROCESS FOR TREATING IMPREGNATION PROCESS WASTE WATER

[75] Inventors: Charles M. Muisener, Newington; Edward K. Welch, II, Bristol, both of Conn.

[73] Assignee: Loctite Corporation, Hartford, Conn.

[*] Notice: The portion of the term of this patent subsequent to Apr. 9, 2008 has been disclaimed.

[21] Appl. No.: 816,689

[22] Filed: Jan. 2, 1992

Related U.S. Application Data

[60] Division of Ser. No. 526,429, May 21, 1990, abandoned, which is a continuation-in-part of Ser. No. 142,604, Jan. 11, 1988, abandoned.

[51] Int. Cl.$^5$ .................. C02F 1/32; C02F 1/52
[52] U.S. Cl. ..................... 210/734; 210/737; 210/748; 210/908
[58] Field of Search ............ 210/734, 748, 732, 733, 210/735, 736, 737, 765, 96.1, 195.1, 251, 908, 909

[56] References Cited

U.S. PATENT DOCUMENTS

| | | | |
|---|---|---|---|
| Re. 32,240 | 9/1986 | De Marco | 526/328 |
| 3,503,946 | 3/1970 | Scanley et al. | 210/734 |
| 3,672,942 | 6/1972 | Neumann et al. | 117/62.2 |
| 3,719,572 | 3/1973 | Burke, Jr. | 204/159.15 |
| 3,969,552 | 7/1976 | Malofsky et al. | 427/295 |
| 4,147,821 | 4/1979 | Young | 427/295 |
| 4,221,634 | 9/1980 | Frost | 162/190 |
| 4,391,686 | 7/1983 | Miller et al. | 204/159.15 |
| 4,416,921 | 11/1983 | Dunn | 427/353 |
| 4,533,446 | 8/1985 | Conway et al. | 204/159.24 |
| 4,556,701 | 12/1985 | Schindler et al. | 526/282 |
| 4,632,945 | 12/1986 | Garcia et al. | 523/176 |
| 4,668,712 | 5/1987 | Hino et al. | 522/13 |
| 4,674,980 | 6/1987 | Ibsen et al. | 433/228.1 |
| 5,006,233 | 4/1991 | Muisener | 210/96.1 |

FOREIGN PATENT DOCUMENTS 2705169 8/1978 Fed. Rep. of Germany .
5047237 4/1975 Japan .

OTHER PUBLICATIONS

Product Brochure LT-969 "Introducing L.I.S./Loctite Impregnation Systems," 16 pages, copyright 1985, Loctite Corporation.

"Gas Chromatographic Determination of the Impurity Composition in Waste Waters and Regenerated Waters During the Synthesis of Polystyrene Plastics with a Closed Water Recycling System". Plasticneski Massy, 1984, No. 4 pp. 49-50.

Primary Examiner—Thomas Wyse
Attorney, Agent, or Firm—Steven J. Hultquist

[57] ABSTRACT

A curable composition, useful for impregnating porosity of porous articles, comprising acrylate monomer, heat- and/or anaerobic-cure initiator, and non-peroxy, actinic radiation photoinitiator. A method of treating waste water produced by aqueous washing of a porous article to remove excess impregnant therefrom, wherein the impregnant comprises acrylate monomer and actinic radiation photoinitiator, includes the steps of exposing the waste water to actinic radiation polymerizingly effective for the monomer, and recovering the resulting polymer from the waster water to yield a polymer-depleted effluent which may be discharged to receiving waters.

22 Claims, 3 Drawing Sheets

PROCESS FOR TREATING IMPREGNATION PROCESS WASTE WATER

CROSS REFERENCE TO RELATED APPLICATIONS

This is a division of U.S. application Ser. No. 07/526,429 filed May 21, 1990, which in turn is a continuation-in-part of U.S. patent application Ser. No. 07/142,602 filed Jan. 11, 1988, abandoned. Concurrently filed with U.S. patent application Ser. No. 07/142,602 on Jan. 11, 1988 is a related U.S. patent application Ser. No. 07/142,738 in the name of Charles M. Muisener, and assigned to the assignee hereof, now U.S. Pat. No. 5,006,233.

BACKGROUND OF THE INVENTION

1. Field of the Invention

This invention generally relates to a resin composition for impregnating porous articles, and to a system for treating waste water from an impregnation process utilizing such resin composition.

2. Background and Description of the Related Art

Impregnation sealing of microporosity is a commonly used methodology in the art of forming a variety of articles, structural components, and assemblies, as for example castings, die castings, electronic components, powder metal parts, fiber-reinforced resin composites and other materials which exhibit porosity.

Originally, materials, manufacturing techniques, and casting designs were specified to minimize the occurrence of porosity in formed objects, based on the hypothesis that microporosity was structurally and functionally undesirable and its presence in formed articles embodied poor manufacturing. This approach severely limited design freedom, and resulted in significant rejection of parts exhibiting any substantial porosity characteristics.

This design strategy changed in the 1970's as a result of the energy crisis, which resulted in a major switch to lighter metals for structural applications. During this period many iron parts were changed to cast aluminum components, and many other parts were designed as die castings. This switch to ligther metals resulted in weight savings in many applications where energy consumption and power optimization were important, but created a new and persistent problem of microporosity in the light metal formed parts. The occurrence of microporosity is particularly acute in components formed from metal powder, and presents a significant obstacle to commercial utility, particularly when such porous parts are employed in fluid power systems and other liquid handling applications.

In order to overcome the deficiencies attendant the presence of microporosity in formed articles of the above-described types, impregnation sealing technology was developed, by which the porosity of the porous parts was impregnated with a sealant composition. Upon curing of the impregnated sealant, the resulting sealed part is suitable for use in fluid exposure applications, as well as facilitating plating, coating, and further processing of the formed article.

Among the impregnation sealing compositions which have been developed to date are self-curing anaerobic sealants and thermal curing sealants, as well as sealants which cure by both anaerobic and heat cure mechanisms.

Electronic encapsulating sealant/coating compositions, curable both anaerobically and with exposure to UV light, have also been developed for vacuum impregnation of electrical components such as transformers, wherein the encapsulating sealant is anaerobically cured inside the device and is cured on the outside surface with UV light to encapsulate the device. To effect a thorough outer surface curing of the sealant, such compositions typically contain a UV photoinitiator in concentrations substantially in excess of 5% by weight, based on the weight of the curable component thereof.

In addition, sealant/coating compositions have been developed for sealing of laminates, composite materials, and the like, containing macroscopic or gross voids into which the sealant/coating composition after surface application flows by capillary, or wicking, action. Generally, sealant/coating compositions employed in such applications are highly viscous in character, having a viscosity substantially greater than 1000 centipoise, as measured by the Cannon-Fenske viscosity determination method. One such conventional formulation, having a Cannon-Fenske viscosity of 4200 centipoise, contains 3.4 weight percent of a UV photoinitiator, based on the weight of curable component in the sealant/coating composition, to effect surface cure of the composition under UV radiation, in combination with internal anaerobic curing of the composition. The high viscosities of such compositions generally require long processing times for impregnation of microporosity.

As a consequence of external surface UV cure employed for the above-described electronic encapsulating sealant/coating compositions and capillary action impregnant compositions, no washing or other removal of excess surface sealant is required in these impregnation systems.

Among the previously developed impregnating compositions for sealing porous parts are the compositions disclosed in the patents identified and discussed below.

E. Neumann U.S. Pat. No. 3,672,942 discloses an anaerobic impregnant comprising a free-radical polymerizable acrylate ester monomer and free-radical polymerization initiator therefor, e.g., a hydroperoxide. The patent discloses utilizing an accelerator in the impregnant, such as aldehyde-amine condensation products, sulfur-containing free-radical accelerators, or organic compounds containing an oxidizable transition metal. This reference also discloses a vacuum impregnation process in which the porous article is placed in a vacuum vessel, followed by drawing of vacuum therein and covering the article with the disclosed anaerobic sealant so that upon release of vacuum, the sealant is forced into the evacuated porosity of the article. The surface of the impregnated article then is treated with the aforementioned polymerization accelerator to cure the sealant at the outer surface of the porous article.

U.S. Pat. No. 3,969,552 describes a washing proces for removing excess impregnant from the surface of the porous article after porosity impregnation. The disclosed impregnation composition comprises an acrylic anaerobic curing resin and a peroxy initiator therefor. The wash solution is an aqueous solution of a surfactant of specified formula. The patent further discloses that the aqueous surfactant solution may contain an accelerator to effect polymerization of the anaerobic sealant in the surface areas of the impregnated part being washed.

J. DeMarco U.S. Pat. No. Re. 32,240 describes a self-emulsifying anaerobic composition for porosity impregnation applications, comprising an anaerobically curing monomer such as an acrylic ester, a peroxy initiator therefor, e.g., a hydroperoxide or perester, an anionic or nonionic surfactant which is dissolved in the composition and renders it self-emulsifying upon mixing with water, and optionally an accelerator for the anaerobic polymerization, e.g., a sulfimide. The impregnant composition of this patent is described as being readily removed from surface areas of porous parts by simple aqueous rinse, even in difficult areas such as small blind holes in complex castings, from which it is difficult to remove excess anaerobic impregnant even with an agitiated water rinse.

M. L. Garcia, et al, U.S. Pat. No. 4,632,945 discloses an anaerobic sealant material comprising a (meth)acrylate monomer, a hydroperoxide or perester initiator, an acclerator having —$SO_2NCO$— functionality, and a transition metal co-acclerator comprising a source of copper ion and an iron salt or ferrocenyl compound.

The above-described anaerobic sealant compositions are typically impregnated in the porosity of porous metal parts by wet vacuum impregnation, wet vacuum/pressure impregnation, or dry vacuum/pressure impregnation. These methods are briefly described below with reference to impregnating of porous parts contained in a basket which is introduced into the impregnation chamber, which is the typical method of parts containment if the parts are of suitably small size; in the case of larger parts, the same are typically mounted on or suspended from hoist or other carrier means which is successively translated through the process system including the impregnation chamber.

In the wet vacuum impregnation process, the basket of porous parts is submerged into a vacuum tank of sealant. A short-term, e.g., 10–12 minute, vacuum cycle removes air from the porosity of the parts. The chamber then is returned to ambient pressure, with sealant penetrating into the evacuated porosity. The basket of parts then may be spun briefly in the vacuum tank to allow centrifugal force to eliminate excess sealant waste.

The wet vacuum/pressure impregnation process is similarly conducted, but with the impregnation chamber being pressurized at the end of the vacuum cycle to drive sealant further into small porosity passages.

In the dry vaccum/pressure impregnation method, the basket of porous parts is placed directly in the dry vacuum chamber. Air is evacuated from the porosity in the parts for a selected length of time, e.g., 10 minutes. A transfer valve then is open, allowing sealant to enter the vacuum chamber from a storage reservoir. The chamber is automatically pressurized to force sealant into the parts. After impregnation, while the sealant is being returned to the reservoir, a centrifuge operation spins the basket to remove excess surface sealant.

Among the foregoing methods, wet vacuum impregnation techniques are generally more widely employed than the dry vacuum/pressure impregnation process.

In the above-described impregnation systems, the anaerobic sealant, except during the imposition of vacuum, is continuously aerated to prevent polymerization therof in situ.

Following the initial impregnation step, the impregnated parts are transferred to an agitated water rinse zone, for removal of any remaining surface sealant or sealant trapped in blind holes of the impregnated parts. The agitation of the water rinse zone may be effected by movement of the basket or suspended parts in such zone, and/or mechanical means for effecting circulation of water therein. In the case of small porous parts contained in a basket, it frequently is desirable to operate the water rinse zone in a "tumbling basket" mode to enhance the washing operation and prevent parts with surface sealant deposits which are in contact with one another from sticking together, as a result of polymerization of the contiguous surface sealant deposits.

Following the removal of excess impregnant, impregnated and water-rinsed parts may be transferred in the carrier basket or by conveyor to an activator zone in which the impregnated parts are contacted with a catalyst activator solution, to effect curing of the sealant material at the entrance to the pores in the parts. This creates a hardened plug or cap of sealant material in the outer portion of the pore, trapping the resin for anaerobic self-cure.

Thereafter, the impregnated parts may be transferred to a final rinse zone for removal of the activator solution from the impregnated parts. This final rinse solution may be at elevated temperature, e.g., on the order of about 120° F., to warm the impregnated parts for quick drying, and to accelerate curing of the anaerobic impregnant within the interior porosity of the article, the rate of such cure increasing with increasing temperature.

The final rinse step may also incorporate in the rinse solution suitable rust inhibitor material, for application of a rust inhibiting film to the impregnated article.

As a variation on the above-described impregnation system, it is known to utilize a heat-curing resin in place of the anaerobically-curing resin, whereby the activating and final rinsing steps previously described are eliminated in favor of a hot rinse final step. In the heat-curing resin impregnation system, the parts after impregnation and rinsing of excess surface material, are contacted with hot water at temperatures on the order of 90° C. to cure the impregnant resin.

In all of the above-described impregnation systems, the aqueous washing of the impregnated parts to remove excess surface sealant or sealant trapped in blind holes results in passage of the excess removed resin into the aqueous washing medium. The anaerobic-cure and/or thermal-cure impregnation resins are substantially insoluble in the aqueous washing medium, resulting in the formation of a dispersion or emulsion of the impregnation resin monomer. In order to maximize excess sealant removal action in the aqueous rinse step, clean make-up water is introduced to the rinse tank either continuously or in batch fashion, with corresponding discharge of monomer-containing water from such tank, as waste water effluent.

In conventional impregnation systems of the type described hereinabove, the monomer content of the waste water from the process system may be on the order of from about 0.1 percent up to about 8–10 weight percent (based on the total weight of waste water), or even higher, with concentrations of 0.1–3% being typically encountered.

Heretofore, this monomer-containing waste water effluent of the impregnation process system has either been discharged directly to receiving waters, or else subjected to treatment via conventional biological effluent treatment processes, e.g., activated sludge processing, microbial digestion, etc.

In some instances, the discharge of monomer-containing waste water has resulted in monomer accumulation in the effluent discharge passages and associated valves, tanks, etc., with the result that the agglomerated monomer may experience sufficient lack of oxygen, particularly in the interior of the agglomerated monomeric mass, to cause polymerization to occur. Such build-up of monomer/polymer in the system, if not checked or removed by periodic maintenance, can result in constriction and eventually plugging of effluent water discharge means.

Although the direct discharge or biological treatment of monomer-containing waste water from impregnation systems has been generally satisfactory from an environmental standpoint, there is nonetheless a continuing need to improve the effluent quality of discharge streams from such systems, under the impetus of increasing environmental awareness and legislative and regulatory constraints.

Japanese Patent Application No. 50-47237 filed Apr. 17, 1975 and published Oct. 25, 1976, describes a method for treating eluted waste liquids containing high molecular weight photosensitive resins and low molecular weight reaction monomers, by adding a polymerization initiator to the eluted waste liquid, and subjecting the liquid to heat or light to cause the monomers therein to react (reaction time of 20-40 minutes is disclosed in the specification of this publication, with Example 4 thereof describing photopolymerization by illuminating the waste liquid for one hour with a high-pressure mercury lamp). The reaction product waste liquid then is passed to a concentration tank, from which it is repeatedly circulated through an ultrafiltration apparatus, until concentrated by a factor of 10-15 in the concentration tank. During the ultrafiltration processing of waste liquid, a filtrate is produced which is reused as eluent in the process. When the predetermined concentration in the concentration tank has been achieved, feeding of waste liquid to the concentration tank is discontinued and the ultrafiltration apparatus is shut down. Thereafter, the concentrated waste liquid is mixed with heavy or light oil, and subjected to combustion treatment. The resins disclosed by the patent publication include polyvinyl alcohol, partially hydrolyzed polyvinyl acetate, carbonyl polyvinyl alcohol, hydroxyethyl cellulose, gelatine, and water-soluble nylon. The monomers disclosed therein include acrylates or methacrylates with free hydroxyl groups in the alcohol moieties, half esters of acrylic or methacrylic acids of polyethylene glycol, or ones in which the free hydroxyl groups are etherified. As thermal polymerization initiators, there are disclosed persulfates, redox catalysts, ammonium persulfate-sodium thiol, cumene hydroperoxide-cuprous salts, etc., and the disclosed photopolymerization initiators include water-soluble azo compounds and metal ion initiators. The polymerization initiators may be employed at concentrations of 0.05-0.2 parts by weight per 100 parts by weight of the waste liquid, and anti-foaming agents such as silicone emulsions may be added to prevent foaming during the developing and eluting process steps.

West Germany Offenlegungsschrift 27 05 159 published Aug. 10, 1978, discloses a process for treating waste waters containing from about 15% to about 80% by weight of emulsified polymerizable liquid substances, based on the total weight of waste water, wherein 0.1-10 weight percent polymerization initiators, based on the total weight of waste water, are added for polymerization of the polymerizable substances in the waste water. The polymerization is carried out at temperatures of between 0° C. and 180° C. and pressures of up to 10 bar, preferably between 50° C. and 95° C. under normal pressure, followed by separation of the polymerization products from the water. This publication discloses the use of polymerization initiators such as peroxides and/or hydroperoxides, and the use of polymerization accelerators such as tertiary amines, organic cobalt, and vanadium salts. The disclosed process is described as applicable to treatment of waste water from impregnation of metal castings with unsaturated polyesters. (Meth)acryl esters are also disclosed as polymerizable emulsifiable monomers to which the disclosed process is applicable.

The waste water treatment process disclosed in the West German patent publication described in the preceding paragraph is disadvantageous, insofar as it effects polymerization of the polymerizable substances therein at elevated temperature, since the resulting waste heat of the waste water must be dissipated so that the final effluent is at near-ambient temperature. This is generally required by environmental regulations, e.g., those promulgated by the U.S. Environmental Protection Agency and various state environmental agencies. If these effluent requirements are not met, the resulting thermal pollution may seriously adversely affect the quality of receiving waters, damage or destroy marine life, etc. Accordingly, when polymerization treatment of monomer-containing waste water is conducted at elevated temperature levels, corresponding refrigeration requirements are imposed on the process system, to achieve the requisite near-ambient final effluent discharge temperatures.

It is therefore an object of the present invention to provide an impregnation system wherein the effluent waste water from the water washing removal of excess resin from the impregnation parts, is treated to be significantly depleted in impregnant monomer content.

It is another object of the invention to provide an impregnation composition for impregnating the porosity of porous articles, which when removed in excess amount from impregnated porous articles by aqueous washing, is readily removable from the aqueous washing/rinse medium.

Other objects and advantages of the invention will be more fully apparent from the ensuing disclosure and appended claims.

SUMMARY OF THE INVENTION

In one aspect, the present invention relates to a curable impregnant composition, having utility for impregnation of microporosity, comprising: (a) acrylate monomer; (b) initiator for heat-cure and/or anaerobic cure of the acrylate monomer; and (c) non-peroxy, actinic radiation photoinitiator. The actinic radiation photoinitiator in this composition may for example be present in an amount not exceeding about 5 percent by weight, based on the weight of the monomer.

In another aspect, the invention relates to a method of treating waste water produced by aqueous washing of an impregnated porous article to remove excess impregnant therefrom, wherein the impregnant is a curable composition including acrylate monomer and photoinitiator, comprising the steps of:

(1) exposing at least a portion of the waste water to actinic radiation polymerizingly effective for the aforementioned monomer in the presence of the photoinitiator, thereby forming polymer of such monomer in the waste water; and (2) recovering the polymer waste water to yield a polymer-depleted waste water.

Another aspect of the invention relates to a method of waste water treatment as described above wherein a composition aggolomeratingly effective for the monomer and/or polymer is present in the waste water prior to the recovery step, either in the impregnant composition itself, or as separately introduced to the waste water from the excess impregnant washing step.

Yet another aspect of the invention relates to apparatus for impregnating porous articles and treating waste water resulting from aqueous washing of the impregnated articles to remove excess impregnant therefrom, such apparatus comprising:

(a) an impregnation chamber for impregnation sealing of porous articles;
(b) means for drawing a vacuum on the impregnation chamber, to evacuate porosity of the porous articles therein;
(c) means for contacting porous articles in the impregnation chamber with a curable impregnant composition at higher-than-vacuum pressure;
(d) an aqueous rinse chamber for contacting porous articles after their impregnation with an aqueous rinse medium;
(e) means for introducing aqueous rinse medium to the aqueous rinse chamber;
(f) an actinic radiation exposure chamber;
(g) means for generating actinic radiation and transmitting same into the actinic radiation exposure chamber;
(h) means for transferring effluent aqueous rinse medium from the rinse chamber to the actinic radiation exposure chamber;
(i) a filtration system;
(j) means for transmitting effluent aqueous rinse medium, after actinic radiation exposure, from the actinic radiation exposure chamber to the filtration system;
(k) means for discharging filtered solids from the filtration system; and
(l) means for discharging solids-depleted aqueous rinse medium from the filtration system.

A further aspect of the invention relates to a process for impregnating porosity of a porous article and treating waste water produced by aqueous rinse removal of excess impregnant therefrom, comprising:

(a) impregnating porosity of the porous article with an impregnant comprising (i) acrylate monomer, (ii) initiator for initiating curing of said acrylate monome upon exclusion of oxygen, and/or heating of said mononmer, and (iii) non-peroxy, actinic radiation photoinitiator;
(b) removing excess impregnant from the porous article by aqueous rinsing thereof to produce an effluent rinse water containing removed excess impregnant;
(c) curing the impregnant impregnated in the porosity of the porous article;
(d) exposing the effluent rinse water containing the removed excess impregnant to actinic radiation which is curingly effective for polymerization of acrylate monomer therein, to yield an effluent rinse water containing corresponding polymer; and
(e) recovering corresponding polymer from the effluent rinse water.

Other features and advantages of the invention will be more fully apparent from the ensuing disclosure and appended claims.

BRIEF DESCRIPTION OF THE DRAWINGS

The single FIGURE is a schematic illustration of a process system according to one embodiment of the present invention for impregnating porosity of porous articles and treating waste water produced by aqueous rinse removal of excess applied impregnant from the impregnated porous articles.

DETAILED DESCRIPTION OF THE INVENTION. AND PREFERRED EMBODIMENTS THEREOF

Figure 1A:
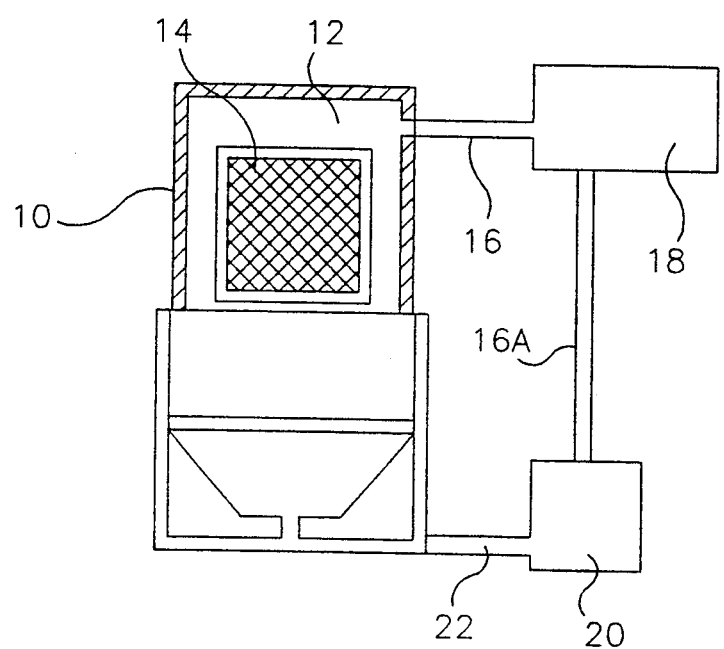
Figure 1B:
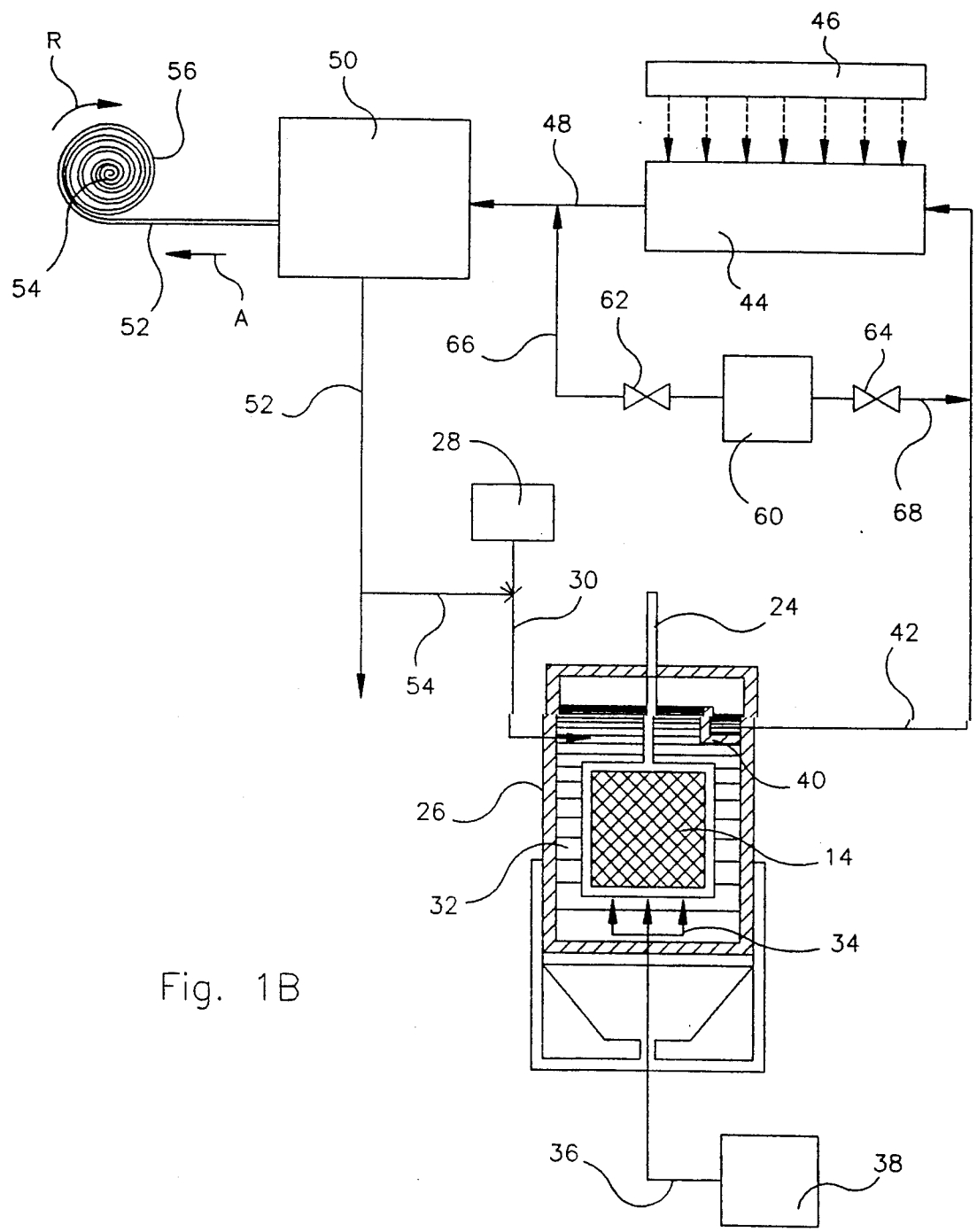
Figure 1C:
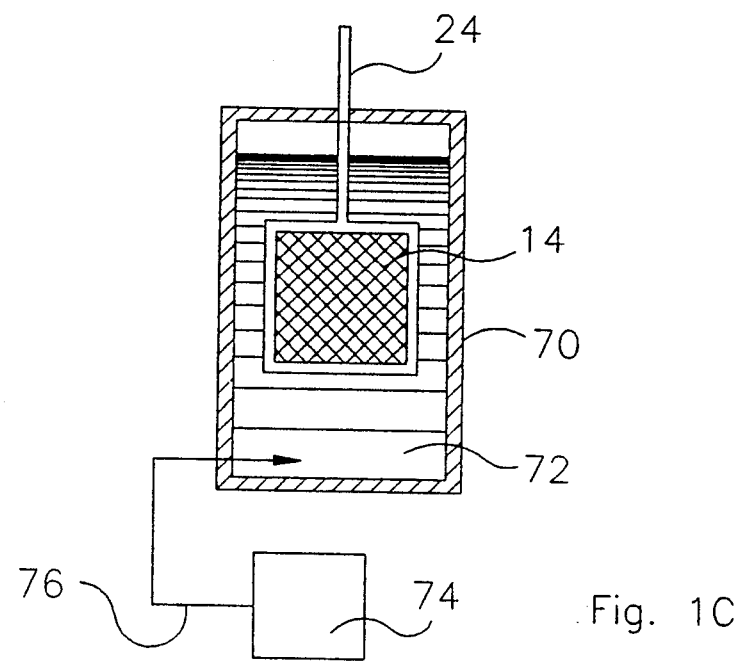
Figure 1D:
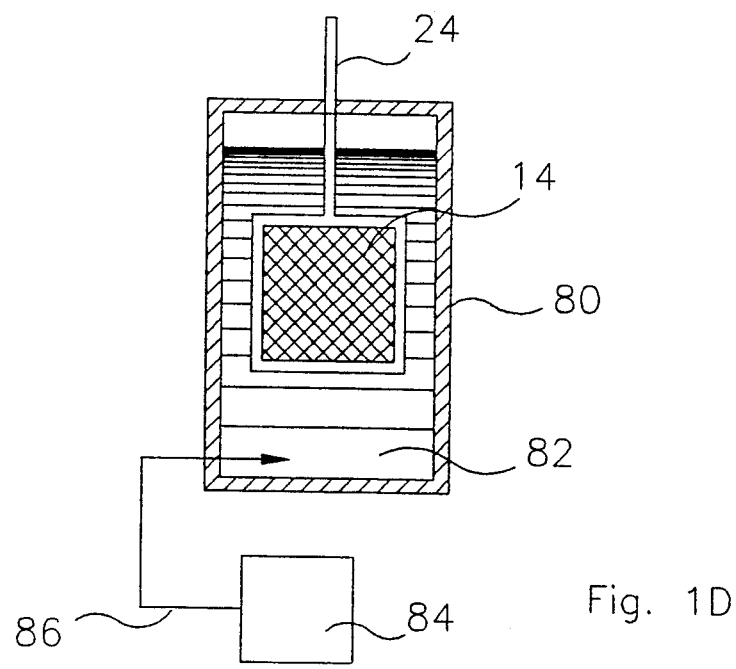

The present invention is based on the discovery that anaerobic- and/or heat-curing, acrylate monomer-based sealant compositions utilized for impregnation of porosity of porous articles may advantageously be formulated with photoinitiators. In use, effluent rinse water produced by aqueous washing removal of excess applied impregnant, may be treated by actinic radiation exposure which is curingly effective in the presence of the photoinitiator for monomer in the impregnant composition, followed by recovery of resultingly formed polymer from the waste water, to yield an effluent water depeleted in monomer and polymer, suitable for discharge to receiving waters.

Thus, the impregnant composition of the invention comprises: (i) acrylate monomer; (ii) initiator which is effective for curing monomer upon exclusion of oxygen and/or heating of the monomer, via free-radical polymerization; and (iii) non-peroxy, actinic radiation photoinitiator which is effective for initiating photopolymerization of monomer under actinic radiation exposure conditions.

Although, as previously described in the "Background of the Invention" section hereof, it has been conventional practice to utilize acrylate monomers in impregnant compositions containing peroxy initiators, for anaerobic- and/or heat-curing of such compositions, and although the aforementioned Japanese Patent Application 50-47237 discloses to treat eluted waste liquids of photosensitive resins by thermal polymerization or photo-polymerization of the monomers in the waste liquid, using suitable thermal initiators or photoinitiators, we are not aware of any previous utilization of acrylate monomer-based impregnant compositions comprising (1) initiator for anaerobic- and/or thermal-cure of the impregnated composition, in combination with (2) non-peroxy, actinic radiation photoinitiator, for actinic radiation polymerization of monomer in effluent rinse water produced by aqueous washing of excess applied impregnant from impregnated porous parts.

The acrylate "monomer" used in the impregnant composition of the invention may be a single acrylate component, or a mixture of different acrylate species. Preferably at least a portion of the acrylate monomer comprises a di- or other polyacrylate ester. These polyfunctional monomers produce cross-linked polymers, which serve as more effective and more durable sealants. While various acrylate monomers may be used, the most highly preferred are polyacrylate esters which have the following general formula:

$$H_2C=C-C-O\left[\begin{array}{c}(CH_2)_m\left(\begin{array}{c}R^4\\|\\C\\|\\R_5\end{array}\right)_p\begin{array}{c}R^4\\|\\C\\|\\R_4\end{array}-O\end{array}\right]_n\begin{array}{c}O\\||\\C-C=CH_2\\|\\R_3\end{array}$$

wherein $R^4$ represents a radical selected from the group consisting of hydrogen, lower alkyl of from 1 to about 4 carbon atoms, hydroxyalkyl of from 1 to about 4 carbon atoms, and $$-CH_2-O-\overset{O}{\overset{||}{C}}-\underset{R_3}{C}=CH_2;$$

$R^3$ is a radical selected from the group consisting of hydrogen, halogen, and lower alkyl of from 1 to about 4 carbon atoms; $R^5$ is a radical selected from the group consisting of hydrogen, hydroxyl, and $$-O-\overset{O}{\overset{||}{C}}-\underset{R^3}{C}=CH_2;$$

m may be 0 to about 12, and preferably from 0 to about 6; n is equal to at least 1, e.g., 1 to about 20 or more, and preferably between about 2 to about 6; and p is 0 or 1.

The polymerizable polyacrylate esters corresponding to the above general formula are exemplified by, but not restricted to, the following materials: di-, tri- and tetraethyleneglycol dimethacrylate, dipropyleneglycol dimethacrylate; polyethyleneglycol dimethacrylate; di(-pentamethyleneglycol) dimethacrylate; tetraethyleneglycol diacrylate; tetraethyleneglycol di-(chloroacrylate); tetramethylene dimethacrylate; ethylene dimethacrylate; and neopentylglycol diacrylate.

While polyacrylate esters, especially the polyacrylate esters described in the preceding paragraphs, have been found particularly desirable, monofunctional acrylate esters (esters containing one acrylate group) also may advantageously used.

The most common of those monofunctional esters are the alkyl esters such as isobutyl methacrylate. Many of the lower molecular weight alkyl esters are quite volatile and frequently it is more desirable to use a higher molecular weight homolog, such as decyl methacrylate or dodecyl methacrylate.

When dealing with monofunctional acrylate esters, it is preferable to use an ester which has a relatively polar alcoholic moiety. Such materials are less volatile than low molecular weight alkyl esters and, in addition, the polar group tends to provide intermolecular attraction in the cured polymer, thus producing a more durable seal. Most preferably the polar group is selected from the group consisting of labile hydrogen, heterocyclic ring, hydroxy, amino, cyano, and halogen polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Other acrylates can also be used. However, when other acrylates are used they preferably are used in combination with one or more members from either or both of the above-described classes of acrylate monomers. In impregnant compositions comprising a mixture of mono- and di- acrylates, the mono-acrylate monomer may suitably comprise from about 20 to about 80 percent by weight of the total weight of mono- and di-acrylate monomers. Most preferably, polyacrylates having the chemical formula given above, comprise at least a portion, preferably at least about 50 percent by weight of the acrylates.

The monomers described above are given anaerobic or heat-cure characteristics by incorporating therein an appropriate polymerization initiator system. The initiator must be capable of inducing polymerization of the monomer or monomers in the substantial absence of oxygen and/or under elevated temperature conditions. Acrylate monomers useful in the present invention may be conveniently cured through a free-radical mechanism, with an initiator system comprising a redox polymerization initiator, i.e., an ingredient or a combination of ingredients which produce an oxidation-reduction reaction, resulting in the production of free radicals. Suitable initiator systems of this type include peroxy materials which, under the appropriate conditions, decompose to form peroxy free radicals.

A class of peroxy initiators which has been found particularly efficient when used in combination with the acrylate monomers described above, is the hydroperoxy initiators. Of this class, the organic hydroperoxides are the most preferred. Cumene hydroperoxide and t-butyl hydroperoxide have been used with particular success in initiating anaerobic curing of acrylate monomers. Methyl ethyl ketone hydroperoxide may likewise be employed. Inorganic peroxides and compounds such as peresters which decompose to form free radicals are also useful. In heat-curing acrylate monomer systems, initiators which may be satisfactorily employed include t-butyl perbenzoate, benzoyl peroxide, benzpinacol, and azo initiators such as those commercially available under the trademark Vazo ® (Vazo ® initiators 52, 64, 67, 68) from E. I. DuPont de Nemours and Company, Inc., Wilmington, Delaware.

As used herein, the term "peroxy" is intended to mean peroxides, hydroperoxides, and peresters, which are suitable for preparing anaerobically- and/or heat-curing monomer systems.

For purposes of versatility, it frequently is desirable to incorporate in the curable impregnant compositions of the invention various initiator accelerators, for example, hydroperoxide decomposition accelerators, when hydroperoxides are used as cure initiators in the impregnated sealant material. Typical examples are tertiary amines such as tributyl amine, sulfimides such as benzoic sulfimide, formamide, and compounds containing transition metals such as copper octanoate.

The impregnant compositions of the invention are suitably non-aqueous, i.e., substantially water-free, in character. The viscosity of the impregnant compositions of the invention suitably does not exceed about 1000 centipoise, and preferably such viscosity is less than about 100 centipoise, most preferably below about 50 centipoise. As used herein, viscosity values are those measured by the Cannon-Fenske method.

While the amount of peroxy polymerization initiator in the impregnant composition of the invention can vary over wide ranges, it usually is impractical for such initiator to comprise more than about 10 percent by weight of the composition, and it preferably does not comprise more than about 5 percent of the composition by weight. Most preferably the peroxy polymerization initiator comprises from about 0.2 percent to about 3 percent by weight of the composition. The weight percent of the peroxy polymerization initiator should not be allowed to decrease below about 0.1 percent, since below that level the cure rate will be unduly slow.

Frequently it may be desirable to add one or more comonomers to the acrylate system, e.g., to modify the viscosity, solvent resistance, or other characteristics of the cured or uncured composition. While the mixture of acrylates generally can be used successfully, other unsaturated comonomers can be used as well. These comonomers typically will be monomers capable of relatively rapid vinyl-type polymerization so that they can copolymerize, at least to a limited extent, with the reactive acrylate monomers. For example, acrylic functionality-containing resins, such as epoxy acrylate and urethane acrylate oligomers and prepolymers, can be advantageously used.

When such comonomers are used, they preferably should not be used in amounts which exceed about 50 percent of the total weight of the acrylate monomer in the system. Other ingredients can be added as well, provided they do not adversely affect the sealing function of the impregnant composition.

In the impregnation process, the impregnant composition in the porosity of the porous article is cured under anaerobic- and/or heat-curing conditions to form a hard, durable resin in the interior porosity of the article. In conventional impregnation processes, as previously described, the porous parts are typically subjected to vacuum either under "wet vacuum" or "dry vacuum" conditions, whereby contact with the impregnant at higher-than-vacuum pressure effects flow of the impregnant into the interior porosity of the parts. Subsequently, the impregnated parts may be spun or otherwise translated in the impregnation chamber above the main resin volume therein, to drain the impregnant from the exterior surfaces of the porous parts. Even after such removal of gross surface accumulations of the impregnant, there is a significant amount of impregnant at the surface of the porous articles, particularly in the vicinity of the pores.

When the impregnant is anaerobically cured, the aforementioned surface accumulations as well as the outermost layer of the impregnant in the pores of the article, particularly shallow surface pores, are in contact with oxygen, so that such surface quantities of the impregnant are uncured or only partially cured. For this reason, the impregnated article is subsequently contacted with an activator for curing of the monomer. The resultingly formed polymer present in shallow surface pores or otherwise accumulated on the surface of the article is highly undesirable, since it can readily contaminate the environment of the porous part, being removable by normal abrasion or by contact with various liquids.

In addition, such surface polymer deposits may, by virtue of their thickness, cause the impregnated product part to vary from the desired dimensional specifications, thus rendering the part deficient or even useless for its intended function in applications requiring close dimensional tolerances.

Further, such surface polymer deposits may interfere with subsequent painting, plating, or assembly operations which frequently are performed on porous articles subsequent to their impregnation. Specifically, such surface polymer deposits may be removed during painting or plating operations, resulting in contamination of the baths used in such operations, and may interfere with the adhesion of paint, plating, etc., to the impregnated part.

When the acrylate monomer is heat-cured, any residual surface accumulations of impregnant are likewise highly undesirable since they produce localized surface asperities which may interfere with subsequent painting or plating operations, or cause delamination of applied paint or plated films.

Based on the desirability of removing residual surface accumulations of the impregnant after the impregnation step (such residual surface accumulations herein termed "excess" impregnant), it is conventional practice to subject the porous parts after impregnation to an aqueous washing step, or "water rinse." The washing step removes the excess impregnant, and the washed porous parts from which excess impregnant has been removed, then may be transferred to subsequent treatment steps, such as activation (immersion of the impregnated parts in an activator solution), heating, final rinsing, drying, application of rust inhibitor, etc.

The aqueous washing for removal of excess impregnant from the impregnated porous parts, results in the formation of impregnant-containing rinse water. The acrylate monomer, being organic and substantially insoluble in the aqueous wash medium, is dispersed along the other impregnant constituents in the wash water. The aqueous washing medium is typically aerated by an air sparger or otherwise agitated to maximize washing efficiency, so that the impregnant becomes finely dispersed in the aqueous wash medium. Further, it has become conventional practice to utilize in the aqueous medium, and/or the impregnant composition, surfactant materials which facilitate the water wash removal of excess impregnant. The use of surfactants and specific materials utilized for such purpose are more fully described in U.S. Pat. No. 3,969,552 and U.S. Pat. No. Re. 32,240, the disclosures of which are hereby incorporated by reference herein. The use of such surfactants in the rinse medium and/or impregnant compositions, enables higher concentrations of acrylate monomer in the rinse water to be achieved, and results in the formation of an emulsion of acrylate monomer in the rinse water.

A specific feature of the impregnant composition of the present invention is the incorporation therein of a suitable non-peroxy photoinitiator, which is curingly effective for the acrylate monomer in the composition, to initiate polymerization thereof under actinic radiation exposure conditions.

As a result of this incorporation of photoinitiator, the waste water which is produced by aqueous washing removal of excess impregnant, may be treated by subjecting the waste water to actinic radiation exposure conditions causing polymerization of acrylate monomer therein. Under such actinic radiation exposure conditions, polymerization of the monomer depletes the waste water in acrylate monomer content, and produces a polymer-containing waste water, from which polymer may be recovered to yield a final waste water effluent of reduced monomer and polymer content, for discharge to receiving waters.

A preferred mode of recovering polymer from the actinic radiation-treated waste water effluent is filtrate thereof.

With regard to the polymerization and recovery treatment of the present invention, it is to be noted that precursor acrylate monomer is typically of sub-micron size in aqueous dispersion. At such size, the dispersed liquid monomer moieties change shape and pass through conventional porous filter media, so that the monomer is not recoverable by filtration processes, even by ultrafiltration. The solid polymer, by contrast, is readily recovered from the waste water.

A combined actinic radiation exposure and filtration apparatus having utility for effecting such acrylate monomer polymerization and filtration removal of resulting polymer from the waste water is disclosed and claimed in copending U.S. patent application Ser. No. 07/142,738 filed concurrently herewith on Jan. 11, 1988 in the name of Charles M. Muisener, and entitled "Water Purification System."

As an alternative to utilizing the photoinitiator-containing impregnant composition of the present invention, a suitable photoinitiator may be separately introduced to the impregnated part aqueous washing chamber, and/or to the rinse water effluent withdrawn therefrom, for subsequent actinic radiation exposure and polymer recovery treatment in accordance with the invention.

Such separate introduction of photoinitator to the aqueous washing chamber and/or the rinse water effluent therefrom, is generally less desirable than simply incorporating such photoinitiator in the sealant composition, since the amount of photoinitiator required for effective waste water treatment is typically significantly increased. However, it may be feasible to utilize, for such separate introduction to the rinse chamber and/or rinse water withdrawn therefrom, a hydrophobic photoinitiator or other photoinitiator having a greater affinity for the aqueously dispersed impregnant than for the aqueous medium. This should allow for minimizing the dosage of photoinitiator required for such separate addition operation(s). Even so, it is not believed to be as effective as direct incorporation of the photoinitiator in the impregnant composition.

The photoinitiator employed in the impregnant composition or otherwise separately added to effect polymerization of the acrylate monomer content of the aqueous washing effluent waste water may comprise any suitable photoinitiator which is effective to induce polymerization of the monomer under appropriate actinic radiation exposure conditions.

Chemical classes of photoinitiator which may potentially be useful in the broad practice of the present invention for this purpose include, but are not limited to, benzoin ethers, alpha dicarbonyl derivatives, chloroacetophenones, alpha hydroxy-ketones, acylophosphine oxides, aromatic ketones, ionium salts, and tertiary amines. The suitability of specific initiator species from the foregoing classes may be readily determined without undue experimentation by the simple expedient of exposing an aqueous dispersion of the monomer containing the photoinitiator to actinic radiation, and determining a suitable concentration by corresponding tests at varying initiator concentrations.

Preferred photoinitiators from the aforementioned classes include the benzoin ether commercially available under the trademark Vicure® 10 from Stauggen Chemical Company (Westport, Conn.); the alphadicarbonyl photoinitiator commercially available under the trademark Irgacure® 651, from Ciba-Geigy Corporation (Ardsley, New York); diethoxyacetophenone; and the alpha hydroxyketone initiator available under the trademark Irgacure® 184 from Ciba-Geigy Corporation (Ardsley, New York).

When the photoinitiator is employed as a component of the impregnant composition, the concentration of the photoinitiator desirably should not exceed about 5 percent by weight, based on the weight of the acrylate monomer. Typically, concentrations of the photoinitiator may suitably range from about 0.05 to 5 percent by weight, based on the weight of monomer, preferably from about 0.1 to about 2 percent by weight, and most preferably from about 0.5 to about 1 percent by weight, on the same basis. As indicated hereinabove, larger amounts of the photoinitiator may be employed, and generally are required where the photoinitiator is added directly to the washing medium in the rinse chamber, and/or to monomer-containing waste water discharged from such chamber.

A highly advantageous impregnant composition containing a peroxy initiator and a non-peroxy photoinitiator in accordance with the present invention, may suitably comprise 70–75 percent of a dimethacrylate ester and 25–30 percent of a monomethacrylate ester, wherein the amounts of acrylate monomers are by weight, and the respective weight percentages of the dimethylacrylate and the monomethacrylate esters total to 100 percent, in combination with 0.25 percent peroxy initiator, 0.5–1 percent non-peroxy photoinitiator, 0.3 percent polymerization accelerator (e.g., benzosulfimide), and 0.05 percent inhibitor, e.g., hydroquinone, wherein the non-acrylate component concentrations are by weight, based on the weight of total monomer. Such preferred impregnant composition may also utilize a small amount of suitable fluorescent additive, e.g., about 0.02 percent by weight, based on the weight of total monomer, of a fluorescent indicator such as the fluorescent composition commercially available under the tradename Natmar Scanning Compound No. 5 (Angstrom Technology, Florence, Kentucky).

In use, the impregnant composition may be conventionally employed in an impregnant chamber of typical construction, wherein a "wet" or "dry" vacuum is imposed on the porous parts to be impregnated, and the evacuated porous parts contact the impregnant composition at higher, e.g., ambient pressure, whereby the impregnant composition passes into the porosity of the porous parts to effect impregnation thereof. The impregnant composition, when of anaerobic curing character, is typically aerated or otherwise maintained in an aerobic state up until the vacuum is applied in the course of the impregnation step, to minimize the occurrence of premature curing or gellation in the impregnation apparatus. It may be suitable in some instances to add catalyst or accelerator species, such as the copper and iron salts/complexes disclosed in U.S. Pat. No. 4,632,945, to the impregnant composition. Stabilizer additives such as dilute sulfuric or phosphoric acid or pyridinyl chelator species may also be added to the impregnant composition.

Referring now to the single FIGURE, there is shown a schematic depiction of a process system for "dry vacuum" impregnation of porosity of porous articles, and treatment of monomer-containing waste water formed by water rinse removal of excess impregnant from the porous articles, together with subsequent illustrative treatment steps for the impregnated porous parts. While the invention is shown with respect to "dry vacuum" arrangement, it will be recognized that this description is for illustrative purposes only, and that the impregnant composition and waste water treatment method of the present invention are equally applicable to process systems including "wet vacuum" impregnation of porous parts, the choice of "wet" or "dry" vacuum impregnation depending on the composition and porous character of the porous parts, and their intended end use application.

The porous part impregnation and waste water treatment system in this illustrative embodiment comprises an impregnation chamber 10 having an interior volume 12 in which is disposed basket 14 containing porous metal parts (not shown for clarity).

The impregnation chamber 10 is joined in flow communication via conduit 16 with a vacuum generating means 18, for selectively drawing a vacuum on the impregnation chamber, so that the air therein is withdrawn to evacuate the porosity of the porous parts in the basket and de-aerate the impregnant.

Subsequent to evacuation of the interior volume 12 of the impregnation chamber 10, impregnant composition stored in reservoir 20 and maintained therein in an aerobic state, at higher pressure than the evacuated chamber, is flowed in line 22 into the interior volume of the impregnation chamber. The anerobic impregnant in reservoir 20 may also be deaerated by means of conduit 16a joining the reservoir with the vacuum generating means, just prior to transferring the impregnant from the reservoir to the impregnation chamber. The vacuum drawn by the vacuum generating means 18 is discontinued once the impregnant fills the impregnation chamber to the desired extent.

As a result, the impregnant penetrates into the porosity of the porous parts in basket 14. Such hydrostatic impregnation may be further assisted by reversing the vaccum generating means 18 to pressurize the interior volume of the impregnation chamber, to force the impregnant composition further into small porosity passages.

Subsequent to this impregnation, the impregnant composition is returned via line 22 to the impregnant reservoir 20. While the sealant is being returned to the reservoir, the basket 14 is spun briefly (by means not shown for clarity) to allow centrifugal force to remove the major portion of the impregnant on the exterior surfaces of the porous parts.

Subsequent to this impregnation, the basket containing the impregnated porous parts is removed from the impregnation chamber and transferred, via a suitable support 24 joined to the basket, to the aqueous washing chamber 26, for water rinse removal of excess impregnant from the impregnated porous articles.

The aqueous washing chamber 26 is furnished with clean rinse water by a clean water source 28, from which rinse water is flowed in line 30 into the aqueous wash chamber 26.

The aqueous wash chamber 26 may suitably receive sparged air in a lower portion of the liquid 32 therein, by a sparger 34 joined by air feed line 36 to a source 38 of compressed air, e.g., a conventional air compressor. The purpose of such air sparging operation is to induce circulatory flow within the wash liquid volume so that residual surface sealant and sealant in shallow surface pores is efficiently removed from the impregnated porous articles in basket 14.

Alternatively, or in addition to the utilization of sparging means as described above, there may be employed in the aqueous washing chamber 26 suitable oscillating and/or tumbling means (not shown) of known conventional type, to maximize the efficiency of removal of the excess impregnant. As a result of the removal of excess impregnant in the aqueous washing chamber, the wash liquid becomes mixed with the removed impregnant composition. The resulting acrylate monomer-containing liquid is discharged from the aqueous washing chamber 26 by means of overlow weir 40, or other suitable discharge means, into effluent line 42. Alternatively, a bottom or intermediate withdrawal of the monomer-containing liquid could be effected The flow rate of effluent aqueous washing medium waste water in line 42 may be monitored or otherwise controlled consistent with the rate of introduction of clean rinse water in line 30, as desired, to maintain a highly efficient aqueous washing removal of excess impregnant from the impregnated porous articles in the washing chamber.

The impregnant-containing waste water discharged in line 42 from the aqueous washing chamber typically contains from about 0.1 to up to about 8-10 weight percent, or more, of the acrylate monomer, based on the total weight of waste water comprising same, and preferably from about 0.1 to about 3 weight percent, on the same basis. As indicated, the impregnant is in dispersed form, typically in emulsified form where the impregnant is self-emulsifying in character or where surfactants or other emulsification-producing components have been added to the impregnant, and/or to the aqueous washing medium in the aqueous wash chamber 26, and/or to the waste water effluent therefrom.

The impregnant-containing waste water from the washing chamber 26 is passed in line 42 to the actinic radiation exposure chamber 44, constructed with an actinic radiation transmissive wall, window, or other portion through which actinic radiation from the actinic radiation source 46 can pass to irradiate the monomer-containing waste water therein. It may be suitable in this respect to fabricate the entire actinic radiation exposure chamber 44 of an actinic radiation-transmissive material, optionally with the provision of multiple circumferentially spaced-apart actinic radiation sources, to maximize the irradiation of the waste water in the chamber 44, by way of minimizing the size and retention time characteristics of such chamber.

With regard to the operation of the actinic radiation exposure chamber, monomer-containing waste water may be processed therein in any convenient flow mode, e.g., batch, semi-batch, or continuous flow. In general, however, continuous flow processing is preferred, wherein monomer-containing waste water is continuously withdrawn from the aqueous washing chamber and flowed through the actinic radiation exposure chamber for conversion of monomer in the waste water to polymer.

The size and configuration of the actinic radiation exposure chamber may be varied widely depending on the volumetric flow rate of waste water being processed, its monomer concentration, the actinic radiation wavelength and intensity, etc., with the specific character and dimensions being readily determinable without undue experiment by those skilled in the art, to achieve the specific desired level of monomer conversion efficiency.

In general, the maximum depth of actinic radiation penetration in the monomer-containing waste water may be on the order of several inches. In an exposure chamber presenting a larger depth of waste water to the actinic radiation, it may be desirable to mix or otherwise induce sufficient circulation of the liquid volume in the chamber, in order to ensure a desired high level of actinic radiation exposure and conversion of monomer throughout the liquid volume.

Consistent with the foregoing consideration, when the actinic radiation exposure chamber is properly dimensioned in relation to the depth of penetration of the actinic radiation and to the extent of circulatory flow of liquid in the chamber, it is generally feasible to obtain substantially complete conversion of monomer to polymer with a retention time of waste water in the chamber on the order of about 5 minutes or less, and preferably about 1 minute or less, particularly when "thin film" irradiation processing of waste water, as described hereinafter in greater detail, is employed.

Using an actinic radiation exposure chamber of square shape having a tranverse dimension of 10 inches and a longitudinal dimension of 12 inches, by way of illustration, the depth of waste water may vary from about 0.25 inch to about 3 inches, or more.

In this illustrative system, the volumetric flow rate of monomer-containing waste water through the actinic radiation exposure chamber may range from about 1 to about 12 gallons per minute, and more typically from about 3 to about 7 gallons per minute. In full-scale waste water treatment systems, the volumetric flow rate of waste water will widely vary, and may be as large as several hundred gallons of waste water per hour or even thousands of gallons of waste water per hour, depending on the specific impregnant composition, the number, type, and intensity of actinic radiation source means, the type of parts being impregnated, the excess sealant washing requirements, etc.

As used herein, "actinic radiation" means electromagnetic radiation having a wavelength of about 700 nanometers (nm) or less which is capable, in the presence of the photoinitiator component, of curing the acrylate monomer in the waste water. The photoinitiator is present in an amount effective to respond to the actinic radiation and to initiate and induce curing of the acrylate monomer by polymerization thereof, but low enough in amount so that the photoinitiator does not initiate substantial polymerization of the impregnated sealant composition in the impregnation tank or during transfer of the impregnated porous parts to subsequent treatment steps, under incandescent, fluorescent, or mercury vapor illumination, or sunlight conditions, as typically encountered in porosity impregnation process environments. The reason that the amount of photoinitiator is below such ambient light polymerization concentration is to avoid "skinning" or surface cure of the impregnant composition on the porous metal parts, prior to the aqueous washing removal of excess impregnant therefrom. Accordingly, it generally is desirable to maintain the concentration of photoinitiator in the impregnant composition of the invention below about 5% by weight, based on the weight of acrylate monomer, e.g., below about 4 weight percent, on the same basis.

Preferably, the actinic radiation generated by actinic radiation source 46 is ultraviolet (UV) radiation, and the photoinitiator is a UV initiator.

Suitable photoinitiators useful with UV radiation curing of acrylate monomers in the process of the invention include free-radical generating UV initiators such as benzophenone, diethoxyacetophenone, benzoin methyl ether, benzoin ethyl ether, benzoin isopropyl ether, diethoxyxanthone, chlorothioxanthone, azo-bis-isobutyronitrile, N-methyl diethanolamine benzophenone, and mixtures thereof.

When the actinic radiation includes visible light, suitable photoinitiators may include camphoroquinone used with an aromatic amine; and fluorenone peresters of the type disclosed in U.S. Pat. No. 4,604,295. Visible light-activated photoinitiators are, however, in general much less preferred than UV initiators, due to the practical problems associated with controlling the visible light exposure of the acrylate monomer-containing waste water in an ambient process environment.

Thus, the acrylate monomer-containing waste water is exposed to actinic radiation in chamber 44 to at least partially polymerize the monomer content of the waste water stream. It is generally desirable to maintain the waste water in chamber 44 in a highly mixed condition, to maximize polymerization efficiency when the waste water is polymerized in bulk volume. For this purpose, the actinic radiation exposure chamber 44 may contain static mixer means, wall-mounted turbulence promoters, mechanical mixing means, etc. (not shown for clarity)

It has also been found highly advantageous and is preferred to continously flow the acrylate monomer-containing waste water in a thin film, e.g., not exceeding about 3 inches in thickness, preferably not more than about 1 inch thick, and most preferably from about 0.25 to about 0.50 inch thickness, through the actinic radiation exposure zone. Such "thin film" irradiation of the monomer-containing waste water eliminates the need for mixing, which is otherwise necessary if a bulk volume of the monomer-containing waste water is to be efficiently exposed to actinic radiation.

As indicated, the actinic radiation is preferably UV radiation. The UV radiation may for example have a wavelength of 365 nanometers at an intensity of from about 80,000 to about 350,000 microwatts per square centimeter (about 800 to about 3500 watts per square meter).

The actinic radiation exposure results in polymerization of monomer in the waste water, to produce polymer-containing, monomer-depleted waste water which is discharged from the actinic radiation exposure chamber 44 in discharge line 48, and passed to the filtration system 50.

The filtration system may be of any suitable type, wherein the polymer-containing waste water is subjected to filtration to recover a polymer-depleted filtrate, which may be discharged from the filtration system in line 52 and passed to receiving waters. Optionally, at least part of the final effluent waste water from line 52 may be diverted in line 54 and passed to rinse water feed line 30, as additional make-up water for the aqueous washing step.

The filtration system is preferably of a type as disclosed and claimed in U.S. patent application Ser. No. 07/142,738 filed concurrently herewith on Jan. 11, 1988 in the name of Charles M. Muisner and entitled "Water Purification System." In the filtration system disclosed in this concurrently filed application, a solids-containing liquid is contacted with a continuously translated web of filter paper, and the resulting solids-bearing web is discharged from the filtration zone. As shown in the FIGURE hereof, filter web 52, of a character which is filteringly effective for the polymer in the waste water, is discharged from the filtration system 50 in the direction indicated by arrow A and wound on a take-up roller 54 rotated in the direction indicated by arrow R (by suitable motive means not shown). The resulting roll 56 of filter paper bearing the recovered polymer may then be suitably disposed of, or processed for recovery of the polymer from the filter web, and subsequent reuse of the filter web. Alternatively, in lieu of roll take-up of the polymer-bearing filter web, the effluent filter web may simply be discharged into a receiving box or other container, for further treatment and/or deposition, as desired.

The above-referenced concurrently filed application discloses a combined apparatus for photopolymerization of the acrylate monomer in the waste water, and filtration recovery of the resultant formed polymer, in a unitary apparatus construction, which may be suitably employed as a consituent part of the impregnation and waste water treatment system of the present invention.

As an optional feature of the process system shown in the FIGURE, it may be advantageous in the broad practice of the the invention to provide a source reservoir 60 of a suitable composition or material capable of aggregating or agglomerating the acrylate monomer and/or corresponding polymer, for enhancing the effectiveness of the process. While any suitable material of such type may usefully be employed, polyelectrolytes which are agglomeratingly effective for the acrylate monomer and/or corresponding polymer in aqueous medium are preferred. The ensuing discussion of the illustrative embodiment of the invention will thus refer to polyelectrolyte materials for carrying out such function, it being understood that such reference is merely illustrative, and that any other suitable materials useful for such purpose may be advantageously employed.

Depending on the opened or closed character of valves 62 and 64 in the respective feed lines 66 and 68, the polyelectrolyte is flowed from the source reservoir 60 for mixing with the acrylate monomer-containing waste water in line 42, or the polymer-containing, monomer-depleted waste water in line 48, or both, as desired.

Such addition of polyelectrolyte to the waste water stream may be advantageous in coalescing the dispersion of monomer and/or polymer, to enhance the efficacy of the respective actinic radiation exposure and polymer recovery steps. Any suitable polyelectrolyte material which is generally effective for coalescing the monomer- and/or polymer-containing dispersion may be employed for this purpose. Examples of illustrative polyelectrolyte materials which may be potentially useful in the broad practice of the invention include an oil-water emulsion of a cationic polyacrylamide, commercially available under the trademark Magnifloc ® 1596C from American Cyanamid Company, Wayne, New Jersey.

As an alternative to introducing an agglomerating agent to the waste water subsequent to the impregnated article washing step, it may be suitable in the broad practice of the present invention to utilize an impregnant composition incorporating such agglomerating material. Such expedient may serve to significantly reduce the dosage level (aggregate amount) of agglomerating material which is utilized for agglomeration of the acrylate monomer, and/or corresponding polymer. If utilized as an integral constituent of the impregnating composition, the agglomerating agent should of course be compatible with the other constituents of the impregnant composition, and stable and otherwise nondeleterious in the impregnant composition.

Accordingly, the present invention contemplates an anhydrous or non-aqueous impregnant composition comprising acrylate monomer, first initiator for initiating polymerization of the acrylate monomer upon exclusion of oxygen and/or upon heating of the monomer, second initiator comprising non-peroxy actinic radiation photoinitiator which is effective for initiating photopolymerization of the acrylate monomer under actinic radiation exposure conditions, and an agglomerating agent which is agglomeratingly effective for the acrylate monomer and/or corresponding polymer. When the polymerizable composition is dispersed in aqueous medium subsequent to the rinsing of the porous article following its impregnation with such polymerizable composition, the in situ agglomerating agent thereafter serves to facilitate re-aggregation of the monomer and/or coalescence of the corresponding polymer.

The invention also, as indicated, contemplates the dosing of the waste water derived from aqueous washing of the porous parts impregnated with the impregnant composition, either prior to actinic radiation exposure of the waste water, in which case the agglomerating agent suitably is effective to agglomerate the acrylate monomer, or else subsequent to the actinic radiation exposure, in which case the agglomerating agent is selected to be agglomeratingly effective for the corresponding polymer. Preferably the agglomerating agent is agglomeratingly effective for both the monomer and the corresponding polymer, so as to maximize the efficiency of removing the monomer/polymer constituents from the waste water.

Subsequent to the aqueous washing step conducted in aqueous washing chamber 26, in which the retention time of the basket of impregnated porous parts may be on the order of 1–2 minutes, the basket of parts is removed from the aqueous washing chamber and transferred to subsequent treatment steps, as may be desirable or required to complete curing of the impregnant composition and/or further processing of the porous articles for their intended end use.

The FIGURE depicts two such additional illustrative treatment steps—activation treatment, and final rinse application of a rust inhibitor to the porous parts. It will be recognized that the subsequent treatment steps (after the aqueous washing removal of excess impregnant) are intended to be illustrative only (for an exemplary anaerobic impregnant composition of the present invention), and not to be limitingly construed with respect to the impregnation, aqueous washing, and waste water treatment process and apparatus of the present invention. It will be appreciated that in the practice of the invention utilizing heat-curing impregnant compositions, activation treatment is not employed; instead the porous parts after washing of excess impregnant therefrom are passed to a chamber containing hot water at elevated temperature, e.g., 90° C., to complete the curing of the heat-cure impregnant. Accordingly, the ensuing description with reference to the FIGURE is in respect of an anaerobic-curing impregnant composition.

The FIGURE shows a first (post-aqueous washing) subsequent step, in which the basket 14 of porous parts coupled with support 24, after the rinse removal of excess impregnant as previously described, is introduced into activation chamber 70.

The activation chamber 70 contains an aqueous solution 72 of the activator material, as supplied from activator reservoir 74 to the chamber in line 76, to cure the impregnant composition at the entrance to the pores in the porous parts. This creates a hardened plug or cap in the outer portion of the pores, trapping the remaining curable composition in the interior pore volume of the porosity, for anaerobic self-cure, in the case of impregnant compositions which are anaerobically curing in character.

The activator may be any suitable material which is effective to cure the impregnant at the surface of each porosity. Illustrative of suitable activator species which may be potentially usefully employed in combinations with anaerobically-curing impregnant compositions, are erythorbic acid, sodium erythorbate, ascorbic acid and ascorbic acid derivatives, thiourea, and sodium metabisulfite. The concentration of activator in the aqueous solution 72 may suitably be up to about 2 percent by weight, based on the weight of water in the solution, with concentrations on the order of 1 percent by weight, on the same basis, being generally usefully employed.

Subsequent to the activation step, the basket 14 of impregnated porous parts is removed from the activator chamber, and transferred to the final rinse chamber 80 containing aqueous rinse solution 82, to remove residual activator solution from the impregnated porous parts and warm the parts for quick drying.

In the rinse chamber as illustrated, the application of a rust inhibiting coating to the rinsed porous impregnated articles may also be effected by transferring a water-soluble rust inhibitor from reservoir 84 to the chamber 80 in feed line 86. In this manner the final rinse removes activator solution, as described, and also effects the coating of the impregnated porous article with a film of a suitable rust inhibitor, on the outer surface of the impregnated article.

The final rinse solution is typically maintained at a temperature of from about ambient temperature up to elevated temperatures on the order of about 120° F. The rust inhibitor which is introduced from reservoir 84 into the aqueous rinse solution 82 must be compatible with the impregnation resin, since after the basket of final treated parts is removed from chamber 80 and the impregnated porous parts removed therefrom, the basket is retured to the head of the process system, filled with new porous parts to be impregnated, and passed to the impregnation chamber 10 for processing in the successive treatment chambers previously described. If the final rinse solution carried over to the impregnation composition, the impregnation process and subsequent treatment steps may be adversely affected. For this reason, nitrite-based rust inhibitors are to be avoided in anaerobic-cure impregnant systems, since the nitrite-based rust inhibitors are generally reactive therewith. Nitrite-based rust inhibitors may, however, be generally advantageously utilized in heat-curing impregnant compositions of the invention.

Illustrative of rust inhibitor compositions which may be usefully employed in the final rinse chamber are the materials commercially available under the trademarks Van Straaten 4171 (Van Straaten Corporation, Chicago, Illinois), and Rust Veto 65 (E. F. Houghton & Company, Philadelphia, Pennsylvania).

Although the preceding discussion with respect to the application of rust inhibitor has been described in application to an aneraobic-curing impregnant composition, as applied in a final rinse chamber following the application of activator to the impregnated porous parts, it will be appreciated that rust inhibitor compositions may be correspondingly applied to porous parts after their impregnation with heat-cure impregnant compositions. For example, the rust inhibitor may be added to the liquid volume in the hot water curing tank wherein the heat-cure impregnant is exposed to elevated temperatures for curing thereof.

The porous parts or articles to which the impregnant composition and technology of the present invention are applicable include castings, die castings, electronic components, powder metal parts, plastic composites such as fiber reinforced resin assemblies, as well as any other porosity-containing articles which are advantageously porosity-sealed. The porosity-containing articles with which the invention may advantageously be practiced, may be formed of any suitable materials, such as for example metals, glass, plastics, ceramics, etc., and including combinations, alloys, aggregates, and composites thereof.

The features and advantages of the invention are more fully shown by the following non-limiting examples, wherein all parts and percentages are by weight, unless otherwise expressly stated.

EXAMPLE I

A base impregnant composition was made up having the formulation set out in Table I.

TABLE I

| Component | Concentration, Wt. % |
|---|---|
| Triethylene glycol dimethacrylate | 71.4 |
| Lauryl methacrylate | 15.0 |
| Hydroxypropyl methacrylate | 10.0 |
| Surfactant | 2.5 |
| Fluroescent dye | 0.51 |
| Quinone* | 0.04 |
| Benzosulfimide | 0.30 |
| T-butyl hydroperoxide | 0.25 |
| Total | 100.0 |

*includes quinone content of quinone chelator in triethylene glycol dimethacrylate component.

Using the above-described impregnant composition, five aqueous solution samples thereof were made up. Samples 1, 2 and 5 comprised two percent solutions of the impregnant composition, based on the total weight of solution. Samples 3 and 4 were five percent aqueous solutions of the impregnant compositions, on the same total solution weight basis.

As the photoinitiator, each of the above-described samples contained one weight percent, based on weight of the acrylate monomer, of a substituted acetophenone UV initiator (Irgacure ® 184, Ciba-Geigy Corporation, Ardsley, New York).

400 milliliters of each sample aqueous solution was placed in a container. Samples 1-3 were placed in a plated aluminum dish, in which the liquid depth was ⅛ inch. Samples 4 and 5 were placed in a Pyrex ® glass bowl 8 inches in diameter and 3 inches in depth, wherein the liquid depth was ⅜ inch. Samples 4 and 5 were maintained in a stirred condition by placing the Pyrex ® glass bowl on a magnetic stirrer plate with a stir bar in the solution, to induce turbulence therein.

A UV light source L/C chamber with a 12 inch lamp set at 300 watts per inch was employed as an actinic radiation exposure source for each of the above-described acrylate monomer-containing aqueous solutions. The temperature of each sample was measured before UV irradiation, together with the distance between the aqueous solution surface and the shutter of the UV light source. After UV exposure, the aqueous solution was filtered through a conventional coffee filter to determine whether any of the emulsified monomer had been polymerized, as evidenced by particulate polymer solids collected on the filter.

Data for the various samples tested are set forth in Table II below.

TABLE II

| Sample | Wt. % Impregnant in Aqueous solution | Solution Temperature Before UV Exposure, °F. | Distance of solution from UV Lamp shutter, in. | UV intensity microwatts per cm² | UV Exposure time, seconds | Solution Temperature after UV Exposure | Comments |
|---|---|---|---|---|---|---|---|
| 1 | 2 | 77 | 8 | 125,000 | 30 | 88 | Plated Aluminum Dish |
| 2 | 2 | 74 | 8 | 125,000 | 60 | 93 | Plated Aluminum Dish |
| 3 | 5 | 72 | 8 | 125,000 | 60 | 97 | Plated Aluminum Dish |
| 4 | 5 | 77 | 6.5 | 155,000 | 60 | 102 | Good Separation |
| 5 | 2 | 77 | 6.5 | 155,000 | 60 | 102 | Cloudy with some polymer |

In samples 1-3, UV exposure resulted in plating of the aluminum dish surfaces with the polymer product of the polymerization of acrylate monomer. Sample 4 after UV exposure evidenced separation of polymer from the aqueous liquid. Sample 5 after UV exposure was cloudy due to the polymer formed therein.

EXAMPLE II

An acrylate monomer-containing solution of waste water, containing 2 percent Resinol® RTC acrylate-based anaerobic curing formulation (Loctite Corporation, Newington, Connecticut), representative of the waste water from a commercial microporosity impregnation system, was employed. The monomer-containing waste water was treated with 0.5 percent diethoxy acetophenone (DEAP), to yield a waste water comprising approximately 98 percent by weight water and 2 percent by weight of the acrylate sealant composition, including therein 0.5 percent by weight DEAP, based on the weight of the acrylate sealant composition. Corresponding waste water formulations were evaluated at varying DEAP concentrations, with the various formulations being exposed to UV radiation for 5, 10, and 15 seconds in the various test runs, and with the UV intensity being varied from 25,000-100,000 microwatts per square centimeter in the various runs.

From these comparative test runs, the DEAP photoinitiator concentration of 0.5 percent by weight, based on the weight of impregnant, was determined to provide the best results.

In a second set of tests, the 0.5 percent DEAP-containing waste water was subjected to UV exposure using various UV light sources, including a Type H bulb, a Type D bulb (Fusion Systems Corporation, Rockville, Md.), and a "standard" bulb (Technacure Systems) having an output of 300 watts per inch. In the test runs, UV exposure times of 15, 30, and 60 seconds were variously employed. The depth of liquid exposed to UV radiation was 3 inches, and the spacing of the UV bulb from the waste water surface was varied between 4 inches and 8 inches in the various tests.

Best results were achieved using an H bulb positioned 4 inches from the waste water surface, at an exposure time of 15-30 seconds. The D bulb was utilized most effectively at a bulb-to-liquid spacing of 4 inches, at an exposure time of 30 seconds. The standard bulb, when used at a bulb-to-liquid spacing of 4-8 inches, generally required 60 seconds exposure to effect polymerization.

Although the optimum UV exposure time varied depending on the specific UV radiation source employed, in all instances effective conversion of acrylate monomer to polymer was achieved. In all tests, the waste water solution after UV exposure was filtered by gravity through Whattman 41 filter paper, with best results being indicated by a "clean" filtrate solution. However, even in instances where the filtrate effluent was cloudy, substantially complete conversion of monomer to polymer was determined to have been achieved.

EXAMPLE III

The use of polyelectrolyte materials for agglomerating polymer in sealant-containing waste water after actinic radiation exposure thereof was evaluated, utilizing 1 percent by weight aqueous solutions of the following polyelectrolyte materials:

| Magnifloc ® | 573C | (Sample I) |
|---|---|---|
| Magnifloc ® | 1596C | (Sample II) |
| Magnifloc ® | 1906N | (Sample III) |
| Magnifloc ® | 1820A | (Sample IV) |

The waste water subjected to treatment with the aforementioned polyelectrolyte solutions, contained Resinol® —X—RTC acrylate-based sealant composition (Loctite Corporation, Newington, Connecticut), which after UV exposure treatment contained about 2 percent polymer by weight, based on the weight of waste water. After a control sample of the polymer-containing waste water had been established, four breakers, each containing 500 milliliters of the polymer-containing waste water, were respectively injected with the polyelectrolyte solution samples. Additional mixing was then carried out using a magnetic stir bar to assure complete blending of the polyelectrolyte. Afterward, the treated solutions were passed throug American Scientific Number 517 fluted filter paper (coarse) and observations were made, as set out in Table III below.

TABLE III

| Sample | Turbidity Before Filtration | Turbidity After Filtration | Ranking |
|---|---|---|---|
| I | Cloudy | Removed Some Polymer | 2 |
| II | Cloudy | Water White | 1 |
| III | Cloudy | Cloudy - No Change | 3 |
| IV | Cloudy | Cloudy - No Change | 4 |

As shown by the tabulated observations and appertaining ranking, the Sample II polyelectrolyte performed the best of all polyelectrolytes tested, producing a water white filtration effluent.

In general, polyelectrolyte materials, depending on their specific type, may be used at widely varying concentrations, as desirable or necessary to achieve a selected extent of coalesence of monomer and/or polymer in the waste water being treated. For example, the polyelectrolyte concentration may usefully range from about 0.01 to about 5% by weight, based on the weight of the waste water being treated. A preferred agglomerant dosage concentration may be on the order of from 0.05 to about 1% by weight, based on the total weight of waste water undergoing treatment, depending on the type, amount, etc. of the monomer and/or polymer in the waste water, which it is desired to agglomerate for recovery of polymer from the waste water.

Based on the amount of acrylate monomer in the impregnant composition, the amount of agglomerating agent may be broadly varied. In general, however, it is suitable to utilize the agglomerating agent at a dosage level (concentration) of from about 0.001% to about 100% by weight, based on the weight of acrylate monomer, more preferably from about 0.1% to about 50% by weight, and most preferably from about 0.1% to about 35% by weight, on the same acrylate monomer weight basis.

EXAMPLE IV

The actinic radiation exposure treatment of monomer-containing waste water and recovery of resultingly formed polymer from the irradiated waste water was evaluated in a process system generally similar to that schematically shown in the single FIGURE hereof, except that a wet vacuum impregnation step was used in place of the dry vacuum impregnation described in connection with the FIGURE.

The actinic radiation exposure of the monomer-containing waste water was carried out using a Type D Fusion Systems UV Curing bulb (Fusion Systems Corporation, Rockville, Maryland), to irradiate a thin film of the waste water having a volumetric flow rate on the order of about 4.75 gallons per minute and an acrylate monomer content on the order of 2-3 percent by weight, based on the weight of the monomer-containing waste water. The actinic radiation exposure chamber was 10 inches wide and 12 inches long. The aforementioned Uv bulb was rated at 300 watts/inch output, with the wavelength of the radiation produced thereby being on the order of 200-450 nanometers.

The filtration operation was carried out with a Serfilco bed filter (Serfilco, Ltd., Glenview, Illinois), provided with a 1 micron (paper) filter medium.

Continuous operation of the above-described system, with thicknesses of the waste water film flowed through the actinc radiation exposure chamber on the order of 3 inches in a first test and 0.50 inch in a second test, yielded substantially complete conversion of monomer to polymer, with a high level of removal of polymer from the irradiated waste water on the filter paper in the filtration step.

While the invention has been described with reference to specific detailed embodiments and features, it will be recognized that numerous variations, modifications, and embodiments are possible, and accordingly, all such variations, modifications, and embodiments are to be regarded as being within the spirit and scope of the invention.

What is claimed is:

1. A method of treating monomer-containing waste water produced by aqueous washing of an impregnated porous article to remove excess impregnant therefrom, comprising:
   (1) using as the impregnant a curable composition comprising acrylate monomer, initiator for initiating curing of said acrylate monomer upon exclusion of oxygen and/or heating of said monomer, and actinic radiation photoinitiator;
   (2) exposing at least a portion of said monomer-containing waste water to actinic radiation polymerizingly effective for said monomer in the presence of said photoinitiator, thereby forming a polymer-containing waste water; and
   (3) recovering said polymer from the polymer-containing waste water to yield a polymer-depleted waste water.

2. A method according to claim 1, wherein an agglomeratingly effective material is provided in to the waste water prior to said recovery step, to coalesce said monomer and/or said polymer, and enhance the efficacy of said recovery step.

3. A method according to claim 2, wherein said agglomeratingly effective material comprises a polyelectrolyte.

4. A method according to claim 3, wherein said polyelectrolyte comprises a cationic polyacrylamide.

5. A method according to claim 1, wherein steps (2) and (3) are carried out in a continuous manner.

6. A method according to claim 1, wherein a thin film of said monomer-containing waste water is exposed to said actinic radiation.

7. A method according to claim 1, wherein the actinic radiation exposure includes an actinic radiation intensity of from about 250 to about 3500 watts per square meter.

8. A process for impregnating porosity of a porous article and treating waste water produced by aqueous rinse removal of excess impregnant therefrom, comprising:
   (a) impregnating porosity of the porous article with an impregnant comprising acrylate monomer, initiator for initiating curing of said acrylate monomer upon exclusion of oxygen and/or heating of said monomer, and actinic radiation photoinitiator;
   (b) removing excess impregnant from said porous article by aqueous rinsing thereof to produce an effluent rinse water containing removed excess impregnant;
   (c) curing the impregnant impregnated in the porosity by the porous article;
   (d) exposing the effluent rinse water containing removed excess impregnant to actinic radiation which is curingly effective for polymerization of acrylate monomer therein, to yield an effluent rinse water containing corresponding polymer; and (e) recovering the corresponding polymer from the effluent rinse water.

9. A process according to claim 8, wherein said actinic radiation is UV radiation.

10. A process according to claim 8, wherein said recovery comprises filtration of the effluent rinse water.

11. A process according to claim 8, further comprising providing an agglomeratingly effective material in the effluent rinse water prior to said recovery step.

12. A process according to claim 11, wherein said agglomeratingly effective material comprises a polyelectrolyte.

13. A process according to claim 12, wherein said polyelectrolyte comprises a cationic polyacrylamide.

14. A process according to claim 8, wherein said impregnant is anaerobically curable, comprising the further step of contacting the impregnated porous article with an activator curingly effective for said impregnant.

15. A process according to claim 14, comprising contacting said porous part after being contacted with said activator, with a rinse solution for removal of activator therefrom.

16. A process according to claim 15, wherein said rinse solution is at elevated temperature to accelerate curing of said impregnant.

17. A process according to claim 15, wherein said rinse solution contains a rust inhibitor, for forming a rust inhibiting coating on said impregnated porous article.

18. A process according to claim 8, wherein said impregnant is heat-curable.

19. A process according to claim 18, comprising the further step of contacting the impregnated porous article with an aqueous solution at an elevated temperature curingly effective for said impregnant.

20. A process according to claim 8, wherein said exposure of effluent rinse water containing removed excess impregnant to actinic radiation comprises radiation exposure of a thin film of the effluent rinse water to said radiation.

21. A process according to claim 8 in which the steps (a) through (e) are carried out in a continuous manner.

22. A process according to claim 8, wherein the actinic radiation exposure of the effluent rinse water includes an actinic radiation intensity of from about 250 to about 3500 watts per square meter.

* * * * *

UNITED STATES PATENT AND TRADEMARK OFFICE
CERTIFICATE OF CORRECTION

PATENT NO.  : 5,273,662
DATED       : December 28, 1993
INVENTOR(S) : Charles M. Muisener
              Edward K. Welch, II It is certified that error appears in the above-identified patent and that said Letters Patent is hereby corrected as shown below:

Column 21, line 59, "417I" should be -- 4171 --.

Signed and Sealed this

Fifth Day of July, 1994

*Attest:*

BRUCE LEHMAN

*Attesting Officer*        *Commissioner of Patents and Trademarks*